Oct. 9, 1956   W. C. STRATMAN ET AL   2,765,685
WIRE STRIPPER
Filed June 7, 1954   4 Sheets-Sheet 1

INVENTORS
WILLIAM C. STRATMAN
RAYMOND E. JONES
FREDERICK I. REGNIER
BY
William R. Lane
ATTORNEY

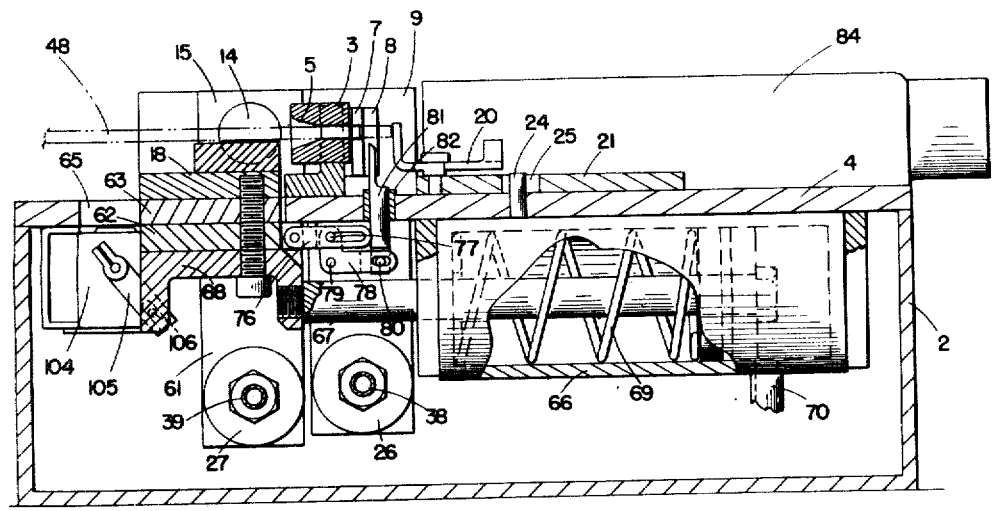
FIG. 6
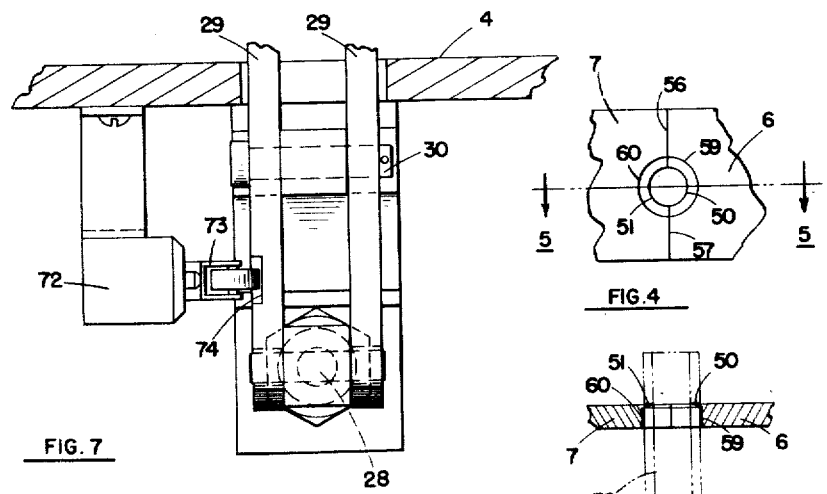
FIG. 7
FIG. 4
FIG. 5

United States Patent Office 2,765,685
Patented Oct. 9, 1956

2,765,685

WIRE STRIPPER

William C. Stratman, Los Angeles, Raymond E. Jones, Lynwood, and Frederick I. Regnier, Redondo Beach, Calif., assignors to North American Aviation, Inc.

Application June 7, 1954, Serial No. 434,692

8 Claims. (Cl. 81—9.51)

This invention pertains to a wire stripper and more particularly to a device which cuts and removes insulation of all kinds from the end of a wire.

The removal of insulation from the end of a wire by a hand operation is quite slow and cumbersome. The problem of speedy and efficient insulation stripping has become aggravated by the increased use of glass cloth type of insulation. Such insulation cannot be burned for severing a section to be removed, and the cutting must be very carefully effected to avoid actual cutting of the wire. According to the provisions of this invention a machine is provided which automatically cuts the insulation on the end of a wire, and then strips this insulation from the wire, in response to positioning of the wire within the machine. No damage to the wire results and the machine, though simplified in construction, is very rapid in its operation.

Therefore, it is an object of this invention to provide a machine for cutting and removing insulation from the end of a wire.

Another object of this invention is to provide a machine for removing insulation from the end of a wire responsive to positioning of the wire in the machine.

A further object of this invention is to provide a machine for removing insulation from a wire without damaging the wire itself.

Yet another object of this invention is to provide a machine which can remove all types of insulation and which operates with great rapidity.

These and other objects will become apparent from the following detailed description taken in connection with the accompanying drawings in which Fig. 1 is a top plan view of the wire stripping machine;

Fig. 4 is an enlarged fragmentary detail view of the cutting portions of the blades;

Fig. 5 is a sectional view taken along line 5—5 of Fig. 4;

Fig. 6 is a sectional view taken along line 6—6 of Fig. 1;

Fig. 7 is a sectional view taken along line 7—7 of Fig. 1; and

Figure 1:
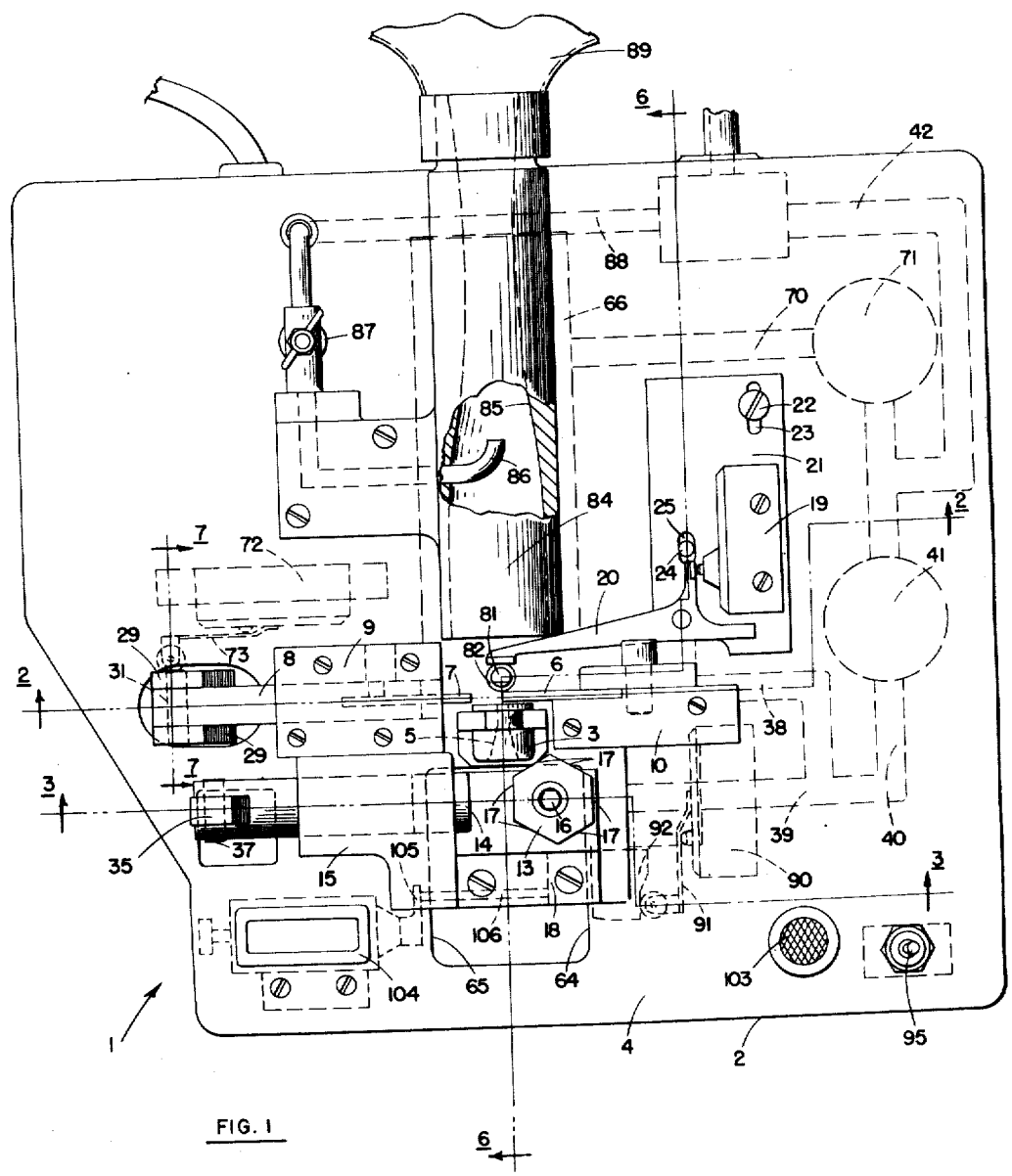
Figure 3:
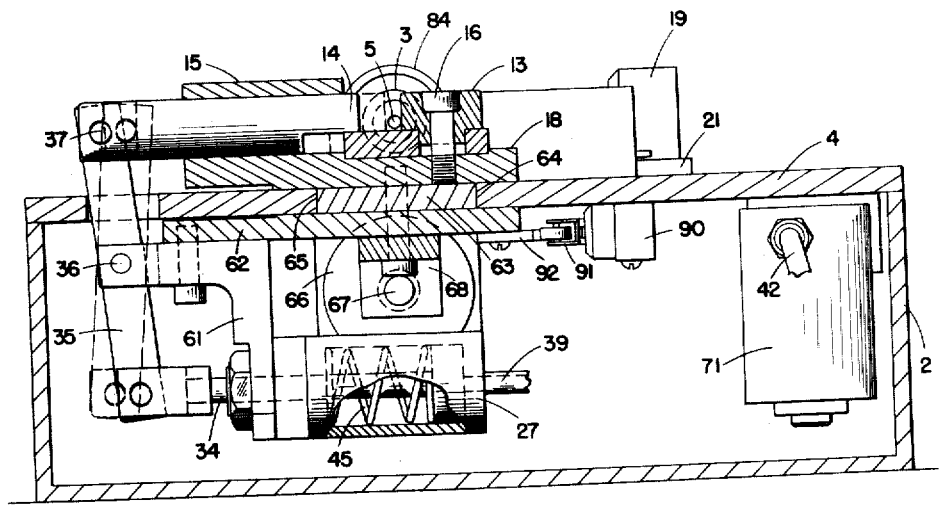
Fig. 3 is a sectional view taken along line 3—3 of Fig. 1 illustrating the action of the jaws.
Figure 2:
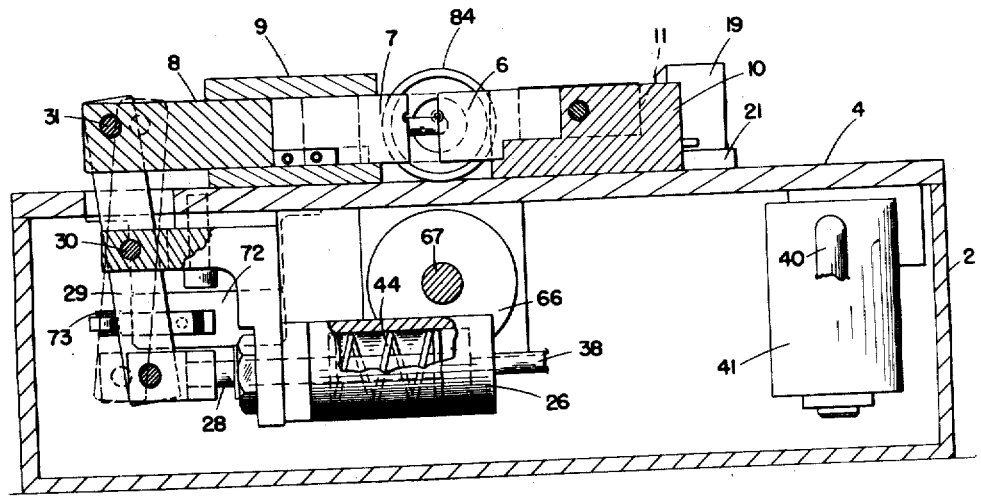
Fig. 2 is a sectional view taken along line 2—2 of Fig. 1 illustrating the movement of the cutting blades.

Referring to the drawings, and especially Figs. 1, 2 and 3, the wire stripping machine 1 of this invention includes a box-like supporting base 2 which may be relatively small and adapted to fit on a workbench. A guide member 3 is carried by the machine above upper surface 4 of the base member. This guide member has a central aperture 5 dimensioned to receive a wire from which insulation is to be removed. This aperture may have a generally conical entrance as illustrated to facilitate insertion of a wire therein. Adjacent guide 3 are a pair of blade members 6 and 7. Blade 6 is a fixed blade while blade 7 is carried by a support 8 which is adapted to slide through complementary guide means 9 for lateral movement relative to the base of the machine. The movement and cutting action of the blade will be more clearly brought out hereinafter. The mounting arrangement for blade 6 includes a recessed support member 10 for the blade including a screw held bracket 11 for locking the blade to the support member. This member is secured to the base so that blade 6 does not move as the machine operates.

Also adjacent guide member 4, but on the opposite side from the blades, are wire gripping jaws 13 and 14. The latter member is movable laterally in the path defined by its supporting member 15 generally similar to the mounting arrangement for laterally movable blade 7, the operation of which will be more clearly brought out hereinafter. Stationary jaw 13 may be hexagonal as shown, held by screw 16 so that the jaw may be locked in position with any of the flat faces 17 adjacent jaw 14. Jaw 13 is constructed so that the various faces 17 are different distances from the central axis of this jaw, providing adjustment so that wires of various sizes can be accommodated. Jaw 13 and support 15 are carried by a mounting plate 18. Like the stationary blade, the stationary gripping jaw does not move relative to its mounting means as the machine operates.

Also above upper surface 4 of the base there is mounted a microswitch 19 having an operating trigger 20 extending to a position in alignment with the guide member and at a predetermined distance past blades 6 and 7. This distance is variable by reason of the mounting arrangement for the switch on its base plate 21. Hold down screw 22 is received within slot 23 of plate 21, while pin 24 fits in slot 25 extending in the same direction. The microswitch may be moved laterally with respect to the base in the path of the slots, and secured in a desired position by tightening screw 22. This controls the distance of trigger 20 past the blades.

Beneath the upper surface of the base are mounted two pneumatic cylinders 26 and 27. These are of the conventional type each having a piston with a rod connected thereto extending beyond the cylinder. The admission of air pressure into the cylinders will move the rods laterally. Accordingly, for cylinder 26 a rod 28 extends therefrom and engages the lower end of a bifurcated lever 29. This lever pivots relative to the base at 30, projecting above the top surface of the base with the upper end thereof at 31 engaging the outer end of support 8 for movable blade 7. In this manner the lever provides a bellcrank so that lateral movement of rod 28 will cause lateral movement in the opposite direction of blade 7 urging it toward blade 6.

Similarly, rod 34 of air cylinder 27 engages a bellcrank 35 pivoted at 36 relative to the base and engaging at 37 the outer end of movable jaw member 14. Therefore, lateral movement of rod 34 against the bottom end of bellcrank 35 will laterally move jaw 14 against stationary jaw 13.

For energizing cylinders 26 and 27 and effecting lateral movement of the rods associated therewith, air lines 38 and 39 connect with these cylinders, uniting in line 40 and passing through solenoid operated valve 41 and air line 42 to a suitable source of pressurized air 43. Springs 44 and 45 in the air cylinders urge the rods toward a retracted position within the pneumatic cylinders. This holds the jaws and the blades open when the cylinders are not under pressure. Microswitch 19 connects to solenoid operated valve 41 so that when the microswitch is tripped the solenoid valve will be opened to admit pressurized air into pneumatic cylinders 26 and 27. These operational features are more fully described below.

In operation of the machine of this invention the end of a wire from which insulation is to be stripped is inserted through aperture 5 in guide member 3 with the wire held generally horizontally above top surface 4 of the base. With the wire projected through the guide member in this manner it is thereby adjacent and received by the blades 6 and 7 on one side of the guide, and with gripping jaws 13 and 14 on the other side. As may best be seen in Fig. 4, wire 48 is thus extended through the guide member until the end thereof contacts trigger 20 of microswitch 19. This trips the microswitch and thereby energizes solenoid valve 41. With the valve so energized air is admitted through lines 38 and 39 to the two pneumatic cylinders pushing against the pistons therein and thereby laterally moving rods 28 and 34. As a result bellcranks 29 and 35 are pivoted about their mounting points and blade 7 and jaw 14 are simultaneously urged into engagement with wire 48.

The two gripping jaws, of course, tightly hold the wire on one side of the guide, while the blades sever the insulation of the wire. The cutting action of blades 6 and 7 may best be seen by reference to Figs. 4 and 5. These blades have arcuate sharpened cutting portions 50 and 51 which, when brought together, are adapted to sever the insulation 53 covering the end of wire 48. The blades will be moved together by bellcrank 29 into abutting engagement at their outer ends 56 and 57. The cutting portions then define a diameter substantially the same as that of the central conductor 58 beneath the insulation. The blades therefore circumferentially sever the insulation covering the wire.

In order to provide a centering action so that neither cutting portion will tend to dig into the central conductor of the wire, and further to assure that all of the insulation will be cut around the circumference of the wire, the two blades are provided with shoulders 59 and 60. Together these shoulders define an opening of a diameter substantially that of the outside diameter of insulation 53. When the blades are forced together the shoulders 59 and 60 engage the outer surface of the insulation and serve to center the wire relative to the blades. This permits the cutting portions 50 and 51 to completely sever the insulation along a circumference of the wire and no damage to the conductor results.

Bracket 61 carries pneumatic cylinder 27 and pivot 36 of lever 35. This bracket is attached to a plate 62, in turn secured to guide 63. Mounting plate 18 for the jaws likewise is attached to the guide. A slot, defined by edges 64 and 65 is provided in upper surface of the base to receive guide 63, and extends normal to the paths of the movable blade and jaw. Plates 18 and 62, and the guide, thus provide a slider movable laterally of the machine in the path provided by the slot in surface 4. The wire gripping jaws, being mounted on the slider, move therewith. Such movement of the slider is effected by means of an air cylinder 66 having plunger 67 extending therefrom attached to bracket 68, in turn secured to plate 62 of the slider. A spring 69 biases the slider toward a retracted position with the plunger within the air cylinder and jaws 13 and 14 positioned close to the guide member 4. An air inlet line 70 connects with pneumatic cylinder 66 and, through solenoid valve 71, passes into the main air supply line. Solenoid valve 71 is normally closed, but when energized will be open so that when air is admitted into cylinder 66, urging the piston therein so as to move the slider and jaws away from the blades.

Operation of solenoid valve 71 is effected by means of a microswitch 72 having trigger 73, as best seen in Figs. 1, 3 and 5, positioned so as to engage cam surface 74 of lever 29. As this lever approaches the end of its movement in response to pressurized air within cylinder 26, it will trip switch 72 whereby the solenoid valve will be energized. Therefore, when the blades have circumferentially severed the insulation on the wire and when the gripping jaws tightly engage the remaining portions of the wire, valve 71 will be opened so that cylinder 66 is pressurized, thereby moving the slider laterally with respect to the machine. This pulls the wire away from the blades, but the blades prevent movement of the severed insulation on the end of the wire. As a result the movement of the slider pulls the insulation off the end of the wire and the wire is stripped clean. The stroke of the slider movement, of course, is sufficient in length to completely pull the severed insulation from the wire end. Thus in a matter of moments a wire may be inserted through the guide member so as to engage trigger 20 of switch 19 thereby closing the jaws and the blades and subsequently moving the wire so as to pull the insulation off of the end thereof.

Connected with the slider is a slotted lever 76 which picks up pin 77 prior to the end of the stroke of the slider. This pin is carried by a bellcrank 78 pivoted at 79 to the base and at 80 to an ejector member 81 which is vertically movable by the lever as guided at 82 through an opening in the base. As a result, when the end of the wire has been withdrawn from the insulation held by the blades, ejector member 81 will rise vertically and kick the insulation loose from the blades. In order to complete the disposal of the severed insulation there is provided a vacuum arrangement which picks up the loosened insulation and withdraws it from the machine. This comprises simply a tubular section 84 having a venturi portion 85 and an air jet 86 connecting through shut-off valve 87 and line 88 to the main air supply source. By the familiar principle of the ejector pump the air jet and venturi serve to create a vacuum which draws the severed insulation away from the blades. A bag 89 on the end of the tubular section 84 receives the severed insulation. The insulation is thus disposed of so that the machine is ready for operation again.

A third microswitch 90 is also carried by the base member and has a projecting trigger 91 extending therefrom to engage the face of cam 92 carried by plate 62 of the slider (see Figs. 1 and 2).

Microswitch 90, normally closed, is opened by the cam when the slider approaches the end of its stroke, and is connected so as to de-energize solenoid valves 41 and 71. When these solenoid valves are de-energized, they are ported to exhaust, relieving the pressure within the cylinders. As a result springs 44, 45 and 69 return the plungers of the various pneumatic cylinders to their retracted positions thereby returning the slider and openings the blades and the jaws. The wire is released and the machine is ready for further operation.

Figure 8:
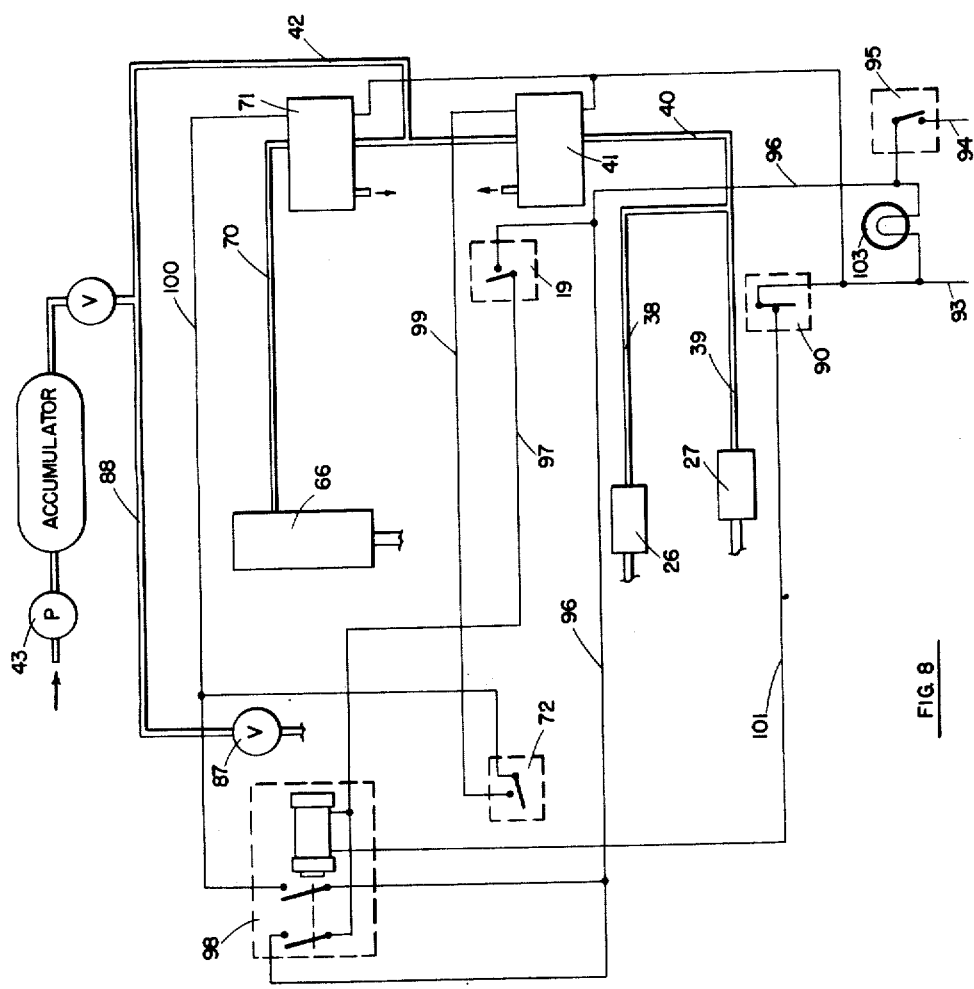
Fig. 8 is a schematic view of the wiring and hydraulic arrangements of the machine.

The wiring arrangement and a schematic showing of the hydraulic system may be seen in Fig. 8. Leads 93 and 94 supply power to the unit, the latter passing through the main on-off switch 95. Conductor 96 extends from the switch 95 to microswitch 19 so that when this switch is closed current may pass through lead 97 to the coil of relay 98, thus closing both the contacts thereof. This permits current to flow through conductor 99 to solenoid valve 41. When subsequently microswitch 72 is closed current flows through lead 100 to solenoid valve 71 thereby opening this valve. Later when normally closed switch 90 is opened by the action of the slider the current to the relay coil 98 through lead 101 will be broken and the contacts of the relay will open. The valves are thus ported to exhaust and the springs return the piston rods to the retracted position. Included with the wiring of the system is a pilot light 103 which indicates when the main switch 95 is on.

Also mounted on the base of the machine is a counter 104 having an actuating arm 105 projecting therefrom. This engages a pin 106 carried by the slider whereby upon each stroke of the slider the counter is actuated to record the wire stripping operation. In this manner the machine automatically records the number of wires stripped thereby.

It can be seen, therefore, that the machine not only automatically cuts the insulation and strips it from the wire responsive to positioning of the wire in the machine, but it ejects the severed insulation and returns to its original position without further attention by the machine operator. Therefore, a high production rate can be maintained from use of the machine. Nevertheless the machine is compact and can be economically fabricated. The cutting blades will remove any type of insulation from the wire without any possibility of damage to the conductor of the wire. Wires of various sizes can be accommodated and the amount of insulation removed can be controlled by positioning the trigger of the microswitch which is tripped by the end of the wire when it is inserted within the machine. The gripping jaws are adjustable while blades can be changed to fit the particular wire being stripped.

The foregoing detailed description is to be clearly understood as given by way of illustration and example only, the spirit and scope of this invention being limited only by the appended claims.

We claim:

1. A wire stripping device comprising a base member; blade members carried by said base member for movement between an open and a closed position and adapted when open to receive an end portion of an insulated wire; a laterally movable member carried by said base member; wire gripping means carried by said laterally movable member for movement between an open and a closed position and adapted when open to receive portions of such a wire adjacent said end thereof; guide means adjacent said blade members and said gripping means for directing a wire to a position where it is so received by said blade member and said gripping means; operating means connected to said blade members, said wire gripping means and said laterally movable member, said operating means including means engageable by said wire when so received and operable upon such engagement for closing said blade means against said wire to a position circumferentially severing the insulation of said wire, for closing said wire gripping means into gripping engagement with said wire, and for subsequently moving said laterally movable member away from said blade means thereby stripping said severed insulation from said end of said wire.

2. A device for stripping insulation from an end of an insulated conductor comprising guide means adapted to receive an end of such a conductor; cutting means disposed on one side of said guide means for receiving said conductor; gripping means disposed on the opposite side of said guide means for receiving said conductor; means connected to said cutting means and to said gripping means and engageable by said conductor when the same is so received for moving said cutting means to a position circumscribing said conductor thereby circumferentially severing said insulation, and for moving said gripping means into gripping engagement with said conductor; means connected to said cutting means and to said gripping means for subsequently moving said gripping means away from said cutting means thereby stripping said severed insulation from said end of said conductor; and means for releasing said gripping means and said cutting means from said conductor thereby releasing said conductor.

3. A device for stripping insulation from an end of a wire having a central conductor and insulation thereon comprising a pair of blade members, said blade members being movable between an open and a closed position, being adapted when open to receive an end portion of such a wire and when closed defining an aperture substantially the dimension of said conductor; a base member supporting said blade members; a pair of jaw members movable between an open and a closed position, being adapted when open to receive such a wire and when closed adapted to grip said wire; a slider laterally movable with respect to said base member and said blade members for supporting and carrying said jaw members; means connected to said blade members and said jaw members and engageable by said wire when within said blade members and said jaw members for substantially simultaneously closing said blade members and said jaw members whereby said blade members circumferentially sever said insulation and said jaw members grip said wire; means connected to said slider for effecting lateral movement of said slider upon said closing of said blade members and said jaw members thereby stripping said severed insulation from said end of said conductor; means adjacent said blade members for ejecting the insulation so severed; and means operable when said slider means has completed said movement for opening said jaw members and said blade members and returning said slider whereby said wire is released.

4. A wire stripping device comprising cutting means adapted to receive an end portion of an insulated wire; wire gripping means adjacent said cutting means and adapted to receive adjacent portions of such a wire; guide means for directing a wire to be so received by said blade means and said wire gripping means; and operating means connected to said cutting means and said wire gripping means, said operating means being engageable by a wire so positioned and including power means operable upon such engagement for moving the said cutting means into engagement with said wire end portion to sever the insulation thereon, to move said wire gripping means into gripping engagement with adajcent portions of said wire, and further including means connected to said wire gripping means and to said cutter means for subsequently moving said wire gripping means relative to said blade means to a position remote therefrom thereby to strip the insulation from said end portion of said wire.

5. A wire stripping device comprising closable cutter means adapted when open to receive an end portion of an insulated wire, and when closed assuming a position severing the insulation on such a wire; closable wire gripping means adjacent said cutter means and adapted when open to receive adjacent portions of such a wire, and when closed assuming a position of gripping engagement with such adjacent portions; power operated means connected with said cutter means and said wire gripping means, said power operated means including closing means for moving said cutter means to said closed positions, and means for subsequently moving said cutter means relative to said wire gripping means to a position remote therefrom while said cutter means and said wire gripping means are in said closed positions thereby to remove the insulation from said end portion of said wire; and trigger means engageable by said wire when so received by said cutter means and said wire gripping means for initiating operation of said power operated means.

6. A wire stripping device for removing insulation from the end of a wire having a central conductor and insulation thereon, said device comprising cutting means having closable blade portions defining when closed an aperture substantially the diameter of said conductor, and having shoulder portions defining when closed an aperture substantially the diameter of said insulation, said blade portions being adapted when open to receive an end portion of such a wire; gripping means adjacent said cutting means; and operating means engageable by a wire received by said cutting means, said operating means including blade closing means connected to said blade portions for closing the same thereby to circumferentially sever the insulation on said wire, means connected to said gripping means for urging the same into gripping engagement with said wire, and means interconnecting said blade portions and said gripping means for causing relative movement away from each other between said blade portions and said gripping means while said blade portions and gripping means are closed, whereby said severed insulation is stripped from said wire.

7. A wire stripping device comprising blade means having cutting portions movable between an open and a closed position, when open being adapted to receive an insulated wire therethrough and when closed said cutting portions defining an opening substantially the size of a conductor beneath such insulation, whereby when said blade means are closed such insulation is circumferentially severed; gripping means movable between an open and a closed position, when open being adapted to receive such a wire and when closed to grip such a wire; and power means connected to said blade means and said gripping means, said power means including trigger means for initiating operation thereof upon positioning a wire so that it is received by said blade means and said gripping means, said power means including a closing means for closing said blade means and said gripping means thereby to grip and to sever the insulation of said wire, and further including means for causing relative movement away from each other of said blade means and said gripping means while the same are in a closed position thereby to strip the severed insulation from said end of said wire.

8. A wire stripping device comprising wire receiving means for receiving the end portion of an insulated wire, said wire receiving means including jaw means movable to a closed position of engagement with a wire received thereby, and blade means movable to a closed insulation cutting position circumferentially severing the insulation on such a wire; and power operated means connected with said wire receiving means for moving said jaw means and said blade means to said closed positions for thereby severing the insulation on a wire received thereby, and gripping the same, and further including means for moving said jaw means relative to said blade means to a position remote therefrom while said jaw means and blade means are in said closed positions, thereby to strip insulation from the end portion of a wire received thereby, said power operated means further including trigger means operatively connected to said power operated means, said trigger means being operable upon positioning a wire in said wire receiving means for initiating operation of said power operated means.

References Cited in the file of this patent
UNITED STATES PATENTS

| | | |
|---|---|---|
| 1,801,278 | Knuuti | Apr. 21, 1931 |
| 1,835,801 | Mayhew | Dec. 8, 1931 |
| 1,998,391 | Shaw | Apr. 16, 1935 |
| 2,497,112 | Andren | Feb. 14, 1950 |
| 2,563,911 | Beck | Aug. 14, 1951 |
| 2,671,363 | Wells | Mar. 9, 1954 |

Notice of Adverse Decision in Interference

In Interference No. 91,154 involving Patent No. 2,765,685, W. C. Stratman, R. E. Jones and F. I. Regnier, Wire stripper, final judgment adverse to the patentees was rendered Mar. 7, 1962, as to claims 2, 4, 5, 7, and 8.
[*Official Gazette August 7, 1962.*]